(12) United States Patent
Preisler et al.

(10) Patent No.: US 6,464,255 B1
(45) Date of Patent: Oct. 15, 2002

(54) KNEE BOLSTER AIRBAG SYSTEM

(75) Inventors: Darius J. Preisler, Macomb; Jason T. Murar, Clinton Township, both of MI (US)

(73) Assignee: Patent Holding Company, Fraser, MI (US)

( * ) Notice: Subject to any disclaimer, the term of this patent is extended or adjusted under 35 U.S.C. 154(b) by 0 days.

(21) Appl. No.: 09/852,950

(22) Filed: May 10, 2001

(51) Int. Cl.[7] .................. B60R 21/045; B60R 21/16
(52) U.S. Cl. .................. 280/752; 280/732; 280/753
(58) Field of Search .................. 280/732, 751, 280/752, 753

(56) References Cited

U.S. PATENT DOCUMENTS

| | | | |
|---|---|---|---|
| 3,768,380 A | | 10/1973 | Stark |
| 3,784,223 A | * | 1/1974 | Hass et al. ............ 137/68.13 |
| 4,198,075 A | * | 4/1980 | Kob et al. ............ 280/728.3 |
| 4,948,168 A | | 8/1990 | Adomeit et al. |
| 5,013,064 A | | 5/1991 | Miller et al. |
| 5,044,663 A | | 9/1991 | Seizert |
| 5,195,776 A | | 3/1993 | Sakakida et al. |
| 5,312,131 A | | 5/1994 | Kitagawa et al. |
| 5,344,184 A | | 9/1994 | Keeler et al. |
| 5,435,594 A | | 7/1995 | Gille |
| 5,531,471 A | | 7/1996 | Terai |
| 5,536,043 A | * | 7/1996 | Lang et al. |
| 5,570,901 A | * | 11/1996 | Fyrainer |
| 5,630,621 A | | 5/1997 | Schneider |
| 5,738,368 A | * | 4/1998 | Hammond et al. ...... 280/730.1 |
| 5,775,729 A | | 7/1998 | Schneider et al. |
| 5,797,620 A | | 8/1998 | Eyrainer |
| 5,816,613 A | | 10/1998 | Specht et al. |
| 5,931,493 A | * | 8/1999 | Sutherland |
| 6,092,836 A | * | 7/2000 | Saslecov ............ 280/730.1 |
| 6,193,272 B1 | * | 2/2001 | Aigner et al. |
| 6,213,497 B1 | * | 4/2001 | Spencer et al. |
| 6,276,731 B1 | * | 8/2001 | Duletzke |
| 6,305,710 B1 | * | 10/2001 | Bosgieter et al. |

* cited by examiner

Primary Examiner—Paul N. Dickson
Assistant Examiner—Joselynn Y. Sliteris
(74) Attorney, Agent, or Firm—Brooks & Kushman P.C.

(57) ABSTRACT

The present invention involves a knee bolster airbag system to dissipate impact energy during an impact of a vehicle in which the system is disposed. The system includes a base which has a first surface disposed toward a vehicle compartment of the vehicle, and a cover having an inner surface attached adjacent the first surface of the base to define a cavity. The cover further has opposite first and second edges, wherein the first edge pivotally attaches the cover to the base about an axis to hinge the first edge of the cover to the base. The system further includes an airbag housing member adjacent which an airbag and a gas source are disposed. The system further includes a tether connected to the base and the cover. The tether allows a predetermined displacement of the second edge away from the base when the airbag is in a deployed state.

19 Claims, 5 Drawing Sheets

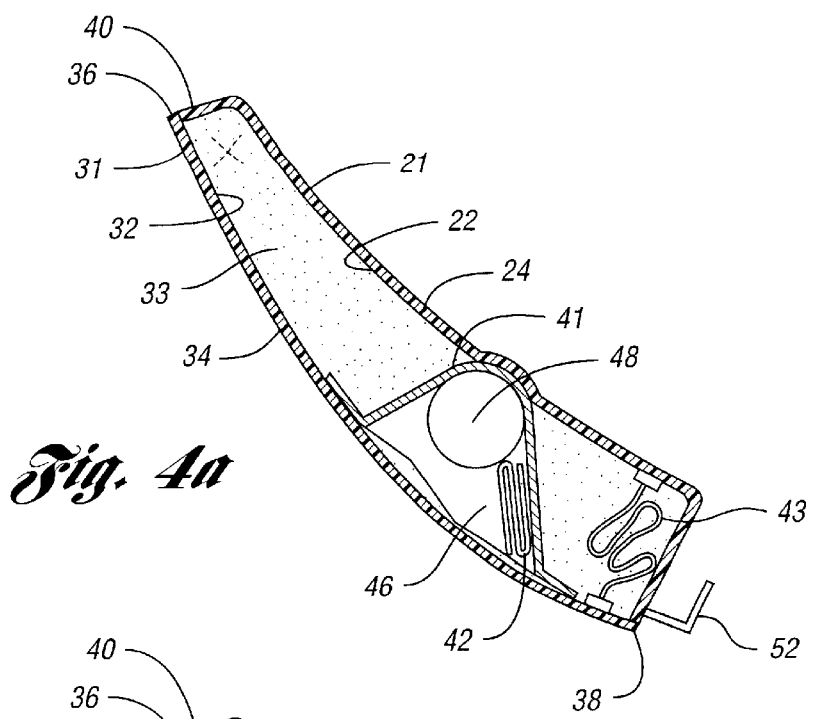
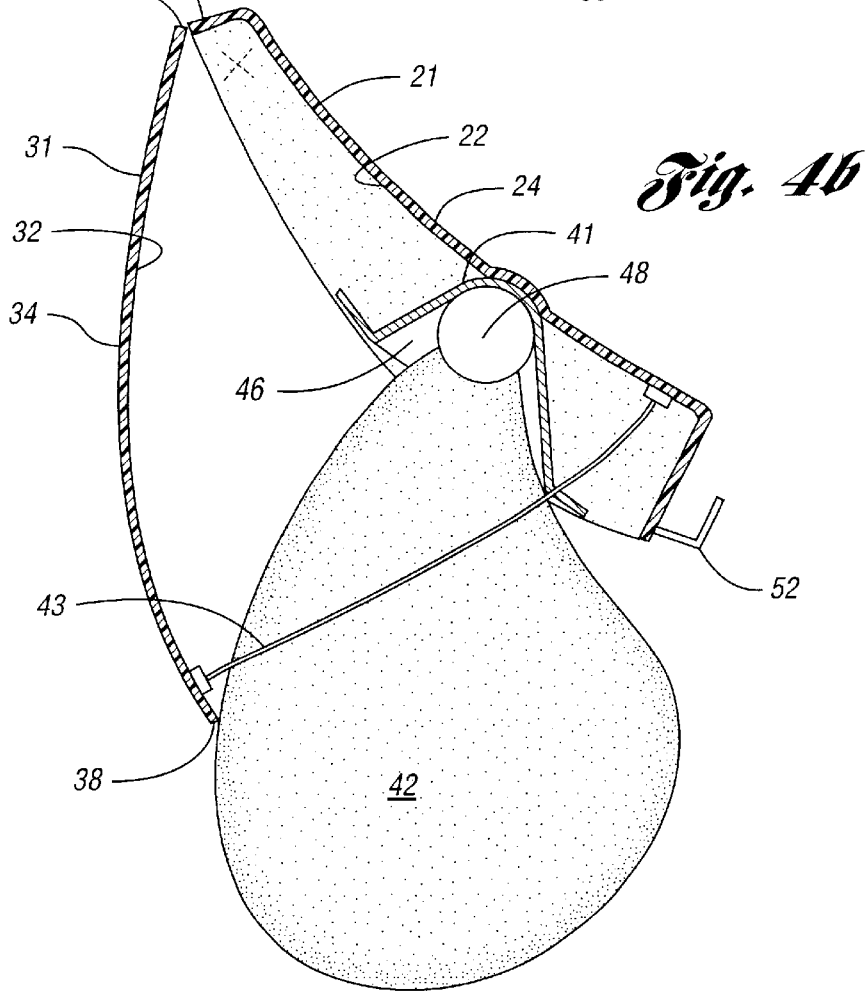

US 6,464,255 B1

KNEE BOLSTER AIRBAG SYSTEM

BACKGROUND OF THE INVENTION

1. Field of the Invention

The present invention relates to a knee bolster airbag system in a vehicle having a vehicle compartment and an instrument panel for deployment of an airbag in the vehicle compartment to dissipate impact energy during a vehicle impact.

2. Background Art

Technology for vehicle knee bolster airbag deployment systems continues to be improved. Currently, knee bolster airbag deployment systems allow an airbag to be deployed into a knee-impact area near a steering column within a vehicle compartment of a vehicle in which the system is disposed. Such systems are configured to deploy an airbag to the knee-impact area upon impact to the vehicle, thereby dissipating impact energy towards an occupant's knees. The system may be disposed in various places within the compartment of the vehicle, for example, adjacent a steering column of the vehicle. There are numerous ways of deploying an airbag from an airbag system. In one way, the system may comprise a housing with a door pivotally attached to the housing. Upon vehicle impact, the door pivots away from the housing to allow for deployment of the airbag.

Manufacturers of such systems have been challenged in improving these systems to deploy in a more effective manner. It is desirable to have these systems disposed nearest the location at which energy dissipation is needed. However, manufacturers are limited as to the distance from which the door may pivot, due to the limited area within the vehicle compartment into which the airbag is to be deployed.

SUMMARY OF THE INVENTION

It is an object of the present invention to provide a knee bolster airbag system having attachable members, one of which pivots away from the other upon deployment of an airbag disposed therein. The member which pivots away from the other is displaced a predetermined distance to provide a more effective manner of deploying the airbag towards an occupant's knees.

It is another object of the present invention to provide a knee bolster airbag deployment system which allows an airbag to be deployed to a lower portion within a vehicle compartment without contacting a knee of an occupant of the vehicle and effectively dissipate impact energy during a vehicle impact.

It is another object of the present invention to provide an improved knee bolster airbag system in a vehicle having a vehicle compartment and an instrument panel for deployment of an airbag in the vehicle compartment to dissipate impact energy during a vehicle impact. The knee bolster airbag system comprises a base which is configured to be mounted in the vehicle adjacent the instrument panel and adjacent a lower area of the vehicle compartment. The base has first and second surfaces, wherein the first surface is disposed toward the vehicle compartment. The system further comprises a cover having inner and outer surfaces, wherein the inner surface of the cover is attached adjacent the first surface of the base to define a cavity between the inner surface and the first surface. The cover has opposite first and second edges, wherein the first edge pivotally attaches the cover to the base about an axis to hinge the first edge of the cover to the base. The system further includes an airbag having a normal state and a deployed state, wherein the airbag is disposed in the cavity to displace the second edge of the cover away from the base and to pivot the first edge about the axis when the airbag is in the deployed state. The system further comprises a gas source which is disposed in the cavity and connected to the airbag. The gas source is operational to place the airbag in the deployed state upon vehicle impact. Furthermore, the system comprises a tether connected between the base and the cover, wherein the tether is disposed adjacent the second edge of the cover. The tether allows a predetermined displacement of the second edge of the cover away from the base when the airbag is in the deployed state.

Another embodiment of the present invention provides, as described above, the improved knee bolster airbag system in a vehicle having a vehicle compartment and an instrument panel for deployment of an airbag in the vehicle compartment to dissipate impact energy during a vehicle impact. The knee bolster airbag system further comprises an airbag housing member attached to the first surface of the base and adjacent the second edge of the cover. The airbag housing member has a receiving surface forming a recess in which the airbag in the normal state is housed.

Other objects, features, and advantages of the present invention will be apparent from the ensuing description in conjunction with the accompanying drawings.

BRIEF DESCRIPTION OF DRAWINGS

FIG. 4a is a cross-sectional view of the knee bolster airbag system with an airbag in a normal state in FIG. 2 taken along lines 4—4;

FIG. 4b is a cross-sectional view of the knee bolster airbag system with the airbag in a deployed state;

DETAILED DESCRIPTION OF THE PREFERRED EMBODIMENT(S)

Figure 1:
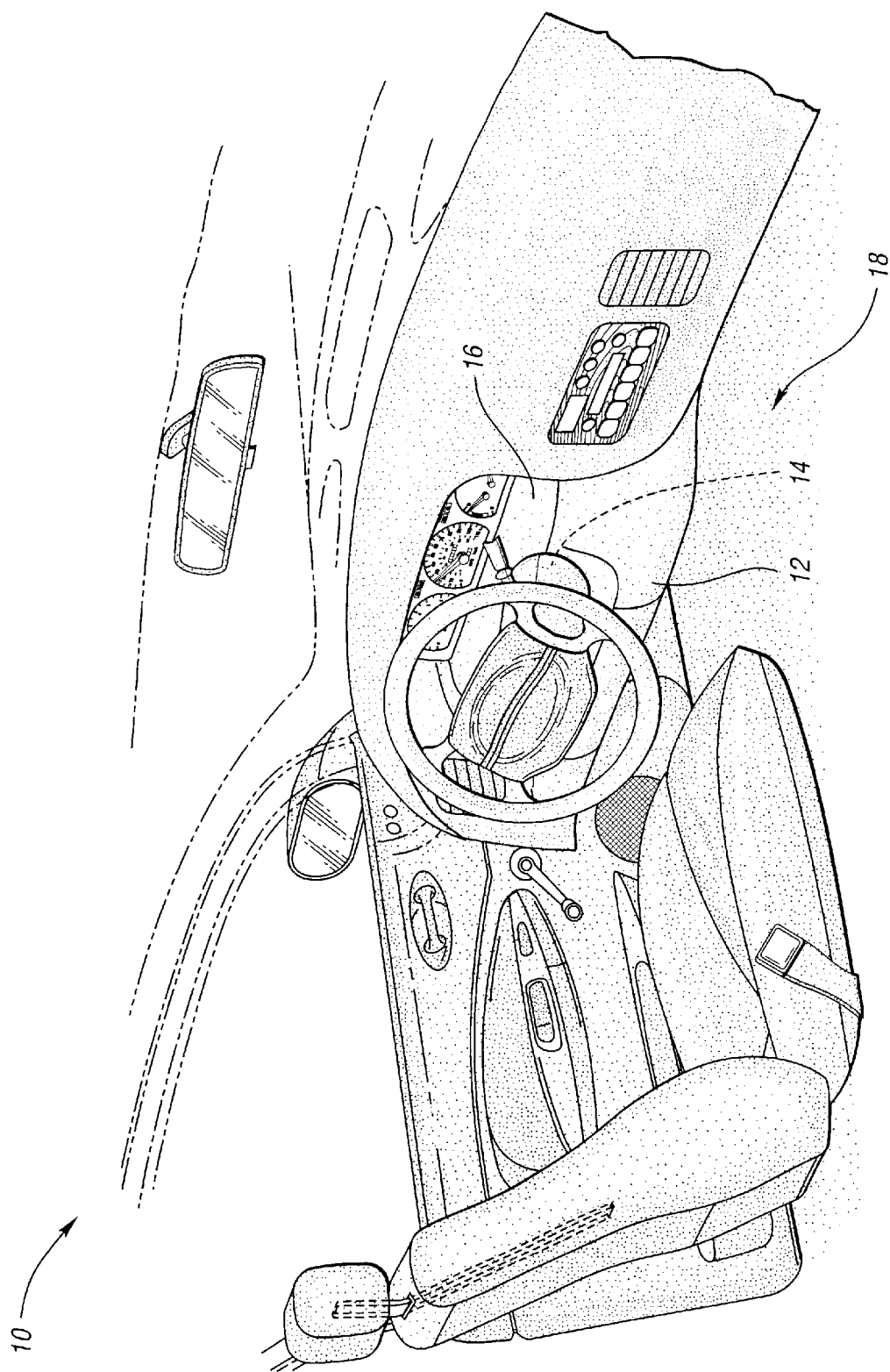
FIG. 1 is an environmental view of a knee bolster airbag system in a vehicle compartment of a vehicle in accordance with the present invention.

FIG. 1 illustrates vehicle 10 in which knee bolster airbag system 12 is disposed adjacent steering column 14 and instrument panel 16. During an impact of vehicle 10, knee bolster airbag system 12 deploys an airbag (not shown) into a lower area of vehicle compartment 18 to dissipate impact energy towards an occupant's knees. As mentioned, system 12 is disposed adjacent steering column 14; however, system 12 may be disposed in any other location in vehicle compartment 18 without departing from the scope or spirit of the present invention.

Figure 2:
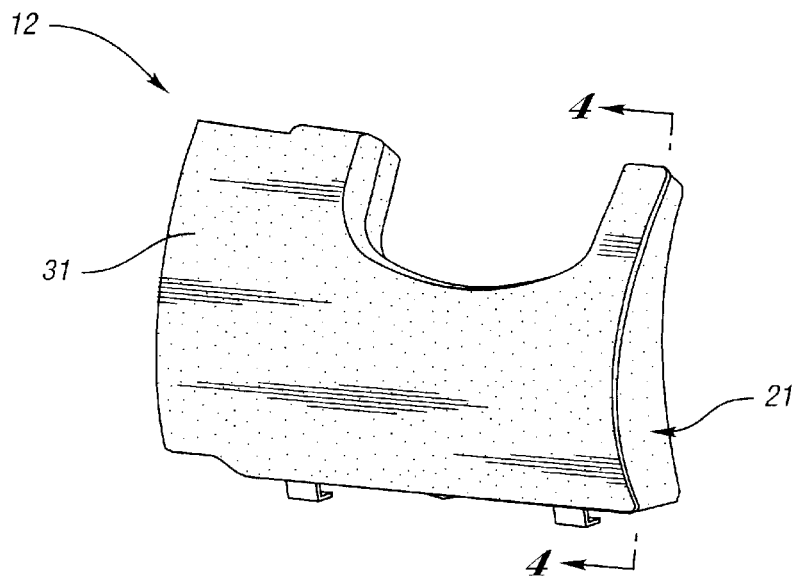
FIG. 2 is a perspective view of the knee bolster airbag system of FIG. 1.
Figure 3:
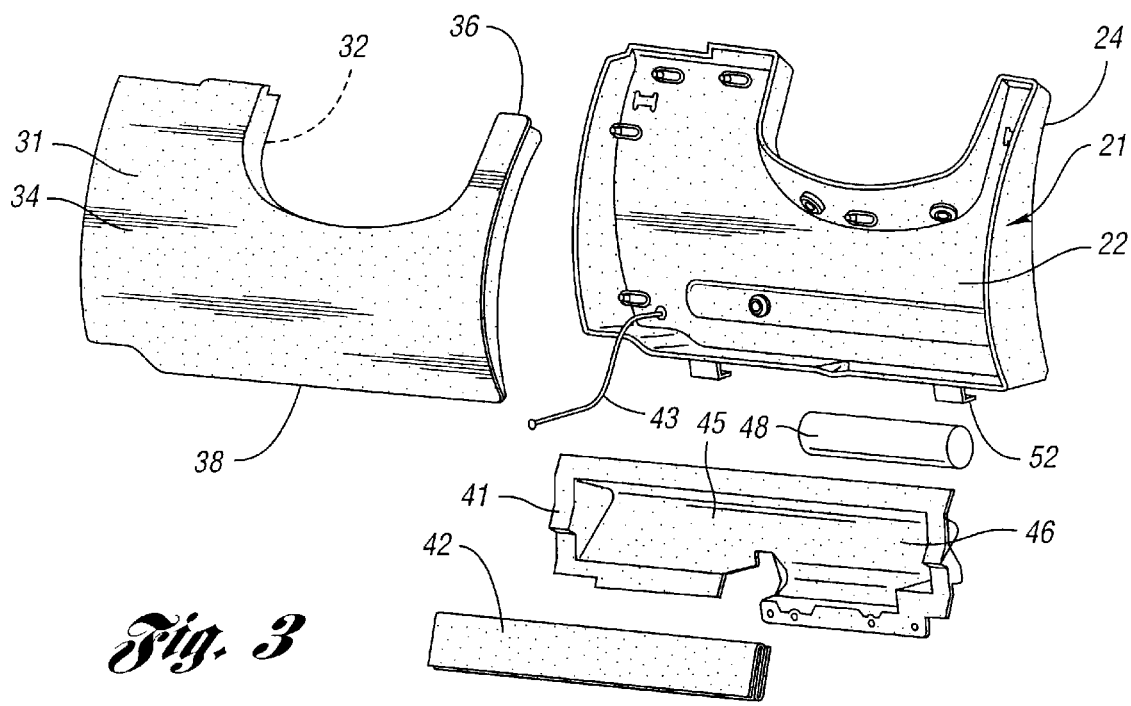
FIG. 3 is an exploded view of the knee bolster airbag system in FIG. 2.
Figure 5:
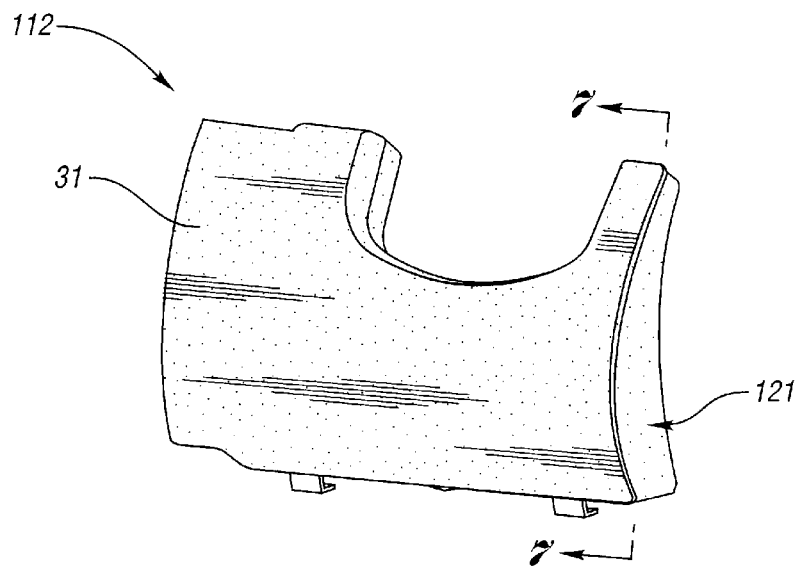
FIG. 5 is a perspective view of another embodiment of the knee bolster air bag system of FIG. 1.
Figure 6:
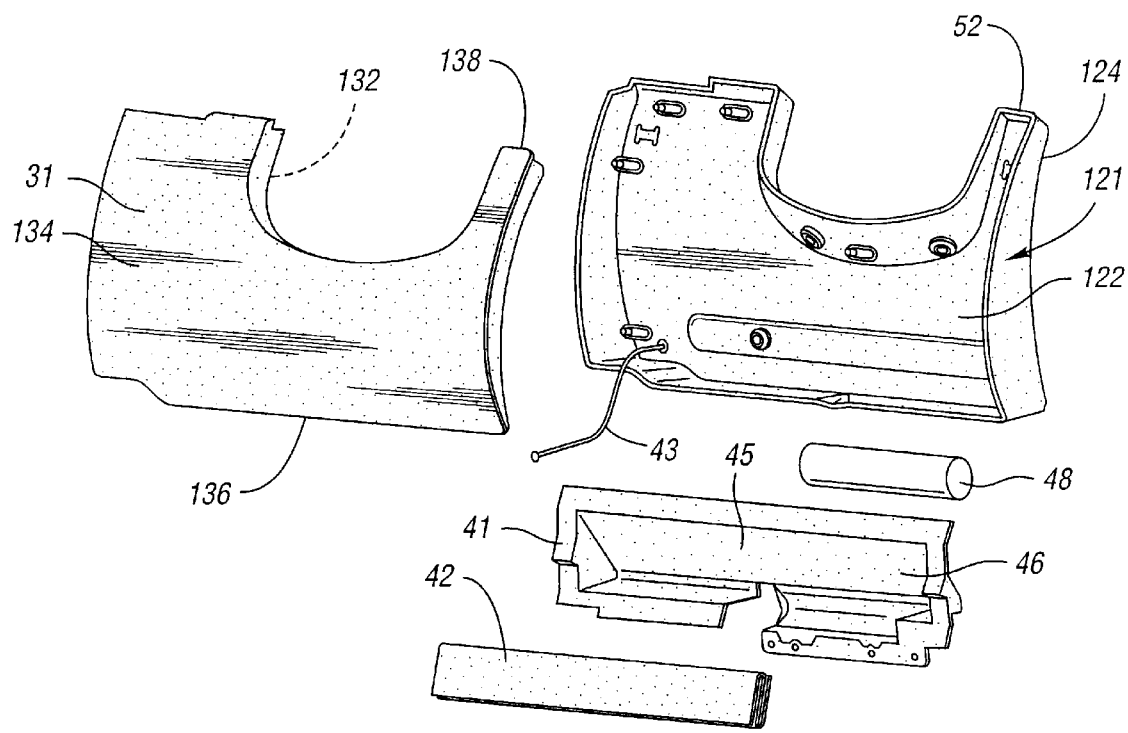
FIG. 6 is an exploded view of the knee bolster air bag system in FIG. 5.
Figure 7A:
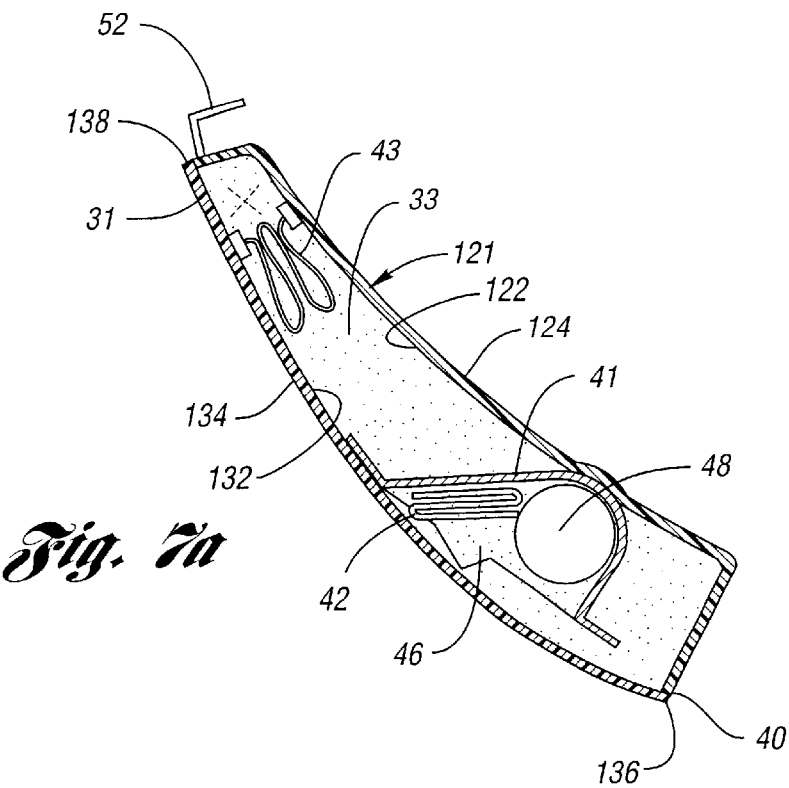
FIG. 7a is a cross-sectional view of the knee bolster air bag system with an air bag in a normal state in FIG. 5 taken along lines 7—7.
Figure 7B:
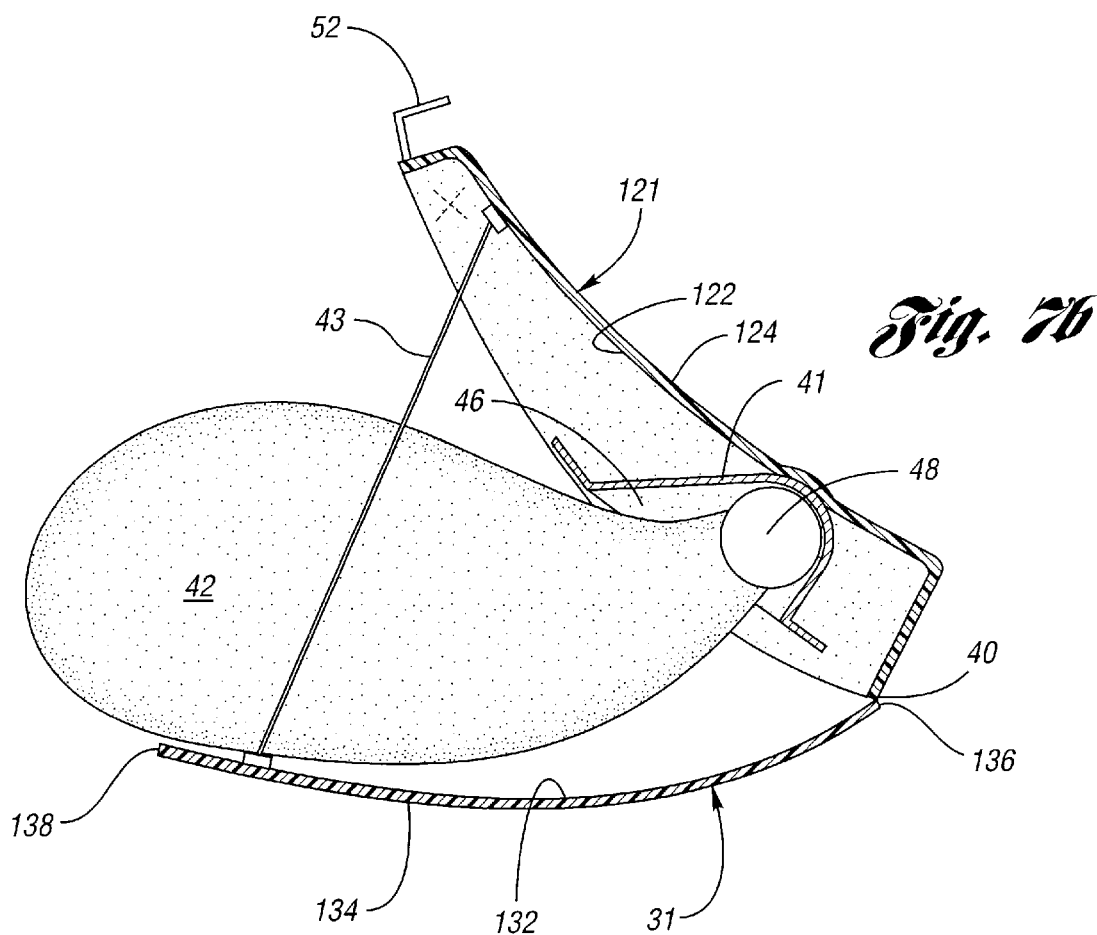
FIG. 7b is a cross-sectional view of the knee bolster air bag system with the air bag in a deployed state.

FIGS. 2 and 3 depict knee bolster airbag system 12. As shown, system 12 includes base 21 which is configured to be mounted in vehicle 10 on the instrument panel 16 and adjacent a lower area of vehicle compartment 18. Base 21 has first and second surfaces 22, 24, wherein first surface 22 is disposed toward vehicle compartment 18. As shown, system 12 further includes cover 31 having inner and outer surfaces 32, 34. Inner surface 32 of cover 31 is attached adjacent first surface 22 of base 21 to define cavity 33 between inner surface 32 and first surface 22 as shown in FIG. 4a. Cover 31 further has opposite first and second edges 36, 38. As shown in FIGS. 4a and 4b, first edge 36 pivotally attaches cover 31 to base 21 about axis 40. First edge 36 pivotally attaches cover 31 to base 21 by any suitable means, such as a metal hinge. This hinges first edge 36 of cover 31 to base 21, allowing for pivotal movement of cover 31 about axis 40 and away from base 21 during an airbag deployment.

As shown in FIGS. 3–4b, system 12 further includes airbag housing member 41 which is attached by any suitable means to first surface 22 of base 21 and adjacent inner surface 32 of cover 31. Airbag housing member 41 has a receiving surface 45 which forms a recess 46 in which an airbag may be housed. As shown, airbag 42, in its normal state, is disposed or housed within airbag housing member 41. Airbag 42 has a normal state and a deployed stated. Airbag 42 is housed in housing member 41 disposed within cavity 33 to displace second edge 38 of cover 31 away from base 21 and to pivot first edge 36 about axis 40 when airbag 42 is in the deployed state.

As shown in FIGS. 3–4b, system 12 further includes a gas source 48 disposed in cavity 33 and connected to airbag 42. Preferably but not necessarily, gas source 48 is disposed adjacent airbag housing member 41. Gas source 48 is operational to place airbag 42 in the deployed state upon vehicle impact. Gas source 48 may be any suitable gas source, known in the art, which may be disposed within the base and the cover, and which allows an airbag to deploy into an adjacent vehicle compartment.

System 12 further includes tether 43 connected to base 21 and cover 31. Tether 43 is disposed adjacent second edge 38 of cover 31, allowing a predetermined displacement of second edge 38 away from base 21 when airbag 42 is in the deployed state. The predetermined distance is a distance sufficient to deploy airbag 42 from cavity 33 in the deployed state to dissipate impact energy during a vehicle impact. This distance is also the distance sufficient to displace second edge 38 of cover 31 from base 21 without contacting a knee of an occupant of the vehicle 10. Upon air bag deployment, base 21 preferably but not necessarily remains stationary relative to cover 31 as cover 31 pivots away from base 21.

Moreover, fasteners 52 are disposed on base 21, and adjacent second edge 38 of cover 31. Fasteners 52 are configured to attach second edge 38 to base 21 when airbag 42 is in the normal state, and to release second edge 38 from base 21 when airbag 42 is in the deployed state. Any suitable fastener, such as a latch, may be used without departing from the scope or spirit of the present invention.

In this embodiment, base 21 and cover 31 may be made of any suitable thermoplastic material. For example, the materials may be a polycarbonate resin containing ecrylonitrile, butadiene, and styrene (PC-ABS) material, thermoplastic elastomer etherether (TEEE), polypropylene, the product having the trade name Santoprene™ supplied by Monsanto Company, or a thermoplastic polyolefinic (TPO) material.

The airbag of the present invention may be any suitable airbag which may be disposed within the base and the cover of the knee bolster airbag system, and which is deployable therefrom upon vehicle impact. The tether of the present invention may be made of any suitable material which may allow the cover to pivot away from the base a predetermined distance during airbag deployment but not allow disengagement of the cover from the base or contact of the cover to a knee of an occupant.

It is to be noted that the knee bolster air bag system of the present invention may be configured in any suitable fashion to deploy an air bag into a lower area of vehicle compartment 18 to dissipate impact energy towards an occupant's knees. In another example of the present invention, FIGS. 5–7b depict knee bolster air bag system 112 having similar components as knee bolster air bag system 12 described above. For example, base 21, first surface 22, second surface 24, inner surface 32, outer surface 34, first edge 36, and second edge 38 of knee bolster air bag system 12 correspond to base 121, first surface 122, second surface 124, inner surface 132, outer surface 134, first edge 136, and second edge 138, respectively, of knee bolster air bag system 112 shown in FIGS. 5–7b.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A knee bolster airbag system in a vehicle having a vehicle compartment and an instrument panel for deployment of an airbag in the vehicle compartment to dissipate impact energy during a vehicle impact, the knee bolster airbag system comprising:

a base configured to be mounted in the vehicle adjacent the instrument panel and adjacent a lower area of the vehicle compartment, the base having first and second surfaces, the first surface being disposed toward the vehicle compartment;

a cover having inner and outer surfaces, the inner surface of the cover being attached adjacent the first surface of the base to define a cavity between the inner surface and the first surface, the cover having opposite first and second edges, the first edge pivotally attaching the cover to the base about an axis to hinge the first edge of the cover to the base;

an air bag having a normal stare and a deployed state, the air bag being disposed in the cavity to displace the second edge of the cover away from the base and to pivot the first edge about the axis when the air bag is in the deployed state;

a gas source being disposed in the cavity and connected to the air bag, the gas source being operational to place the air bag in the deployed state upon vehicle impact; and a tether connected between the base and the cover, the tether disposed adjacent the second edge of the cover, the tether allowing a predetermined displacement of the second edge of the cover away from the base when the air bag is in the deployed state.

2. The knee bolster airbag system of claim 1 further comprising a fastener disposed between the base and the cover, the fastener being adjacent the second edge of the cover, the fastener being configured to attach the second edge of the cover to the base when the air bag is in the normal state, and release the second edge of the cover from the base when the air bag is in the deployed state.

3. The knee bolster airbag system of claim 1 further comprising an airbag housing member attached to the first surface of the base and adjacent the inner surface of the cover, the airbag housing member having a receiving surface forming a recess in which the airbag is housed in the normal state.

4. The knee bolster airbag system of claim 3 wherein the gas source is disposed adjacent the airbag housing member.

5. The knee bolster airbag system of claim 1 wherein the predetermined distance is a distance sufficient to deploy the airbag from the cavity in the deployed state to dissipate impact energy during a vehicle impact.

6. The knee bolster airbag system of claim 1 wherein the predetermined distance is a distance sufficient to displace the second edge of the cover from the base without contacting a knee of an occupant.

7. The knee bolster airbag system of claim 1 wherein the base remains stationary relative to the cover during deployment of the airbag.

8. The knee bolster airbag system of claim 1 wherein the cover pivots about the axis away from the base during deployment of the airbag.

9. A knee bolster airbag system in a vehicle having a vehicle compartment and an instrument panel for deployment of an airbag in the vehicle compartment to dissipate impact energy during a vehicle impact, the knee bolster airbag system comprising:

a base configured to be mounted in the vehicle adjacent the instrument panel and adjacent a lower area of the vehicle compartment, the base having first and second surfaces, the first surface being disposed toward the vehicle compartment;

a cover having inner and outer surfaces, the inner surface of the cover being attached adjacent the first surface of the base to define a cavity between the inner surface and the first surface, the cover having opposite first and second edges, the first edge pivotally attaching the cover to the base about an axis to hinge the first edge of the cover to the base;

an air bag having a normal state and a deployed state, the air bag being disposed in the cavity to displace the second edge of the cover away from the base and to pivot the first edge about the axis when the air bag is in the deployed state;

a gas source being disposed in the cavity and connected to the air bag, the gas source being operational to place the air bag in the deployed state upon vehicle impact;

a tether connected between the base and the cover, the tether disposed adjacent the second edge of the cover, the tether allowing a predetermined displacement of the second edge of the cover away from the base when the air bag is in the deployed state; and an airbag housing member attached to the first surface of the base and adjacent the second edge of the cover, the airbag housing member having a receiving surface forming a recess in which the airbag in the normal state is housed.

10. The knee bolster airbag system of claim 9 further comprising a fastener disposed between the base and the cover, the fastener being adjacent to the second edge of the cover, the fastener being configured to attach the second edge of the cover to the base when the air bag is in the normal state, and release the second edge of the cover from the base when the air bag is in the deployed state.

11. The knee bolster airbag system of claim 9 wherein the gas source is disposed adjacent the airbag housing member.

12. The knee bolster airbag system of claim 9 wherein the predetermined distance is a distance sufficient to deploy the airbag from the cavity in the deployed state to dissipate impact energy during a vehicle impact.

13. The knee bolster airbag system of claim 9 wherein the predetermined distance is a distance sufficient to displace the second edge of the cover from the base without contacting a knee of an occupant.

14. The knee bolster airbag system of claim 9 wherein the base remains stationary relative to the cover during deployment of the airbag.

15. The knee bolster airbag system of claim 9 wherein the cover pivots about the axis away from the base during deployment of the airbag.

16. A knee bolster airbag system in a vehicle having a vehicle compartment and an instrument panel for deployment of an airbag in the vehicle compartment to dissipate impact energy of an occupant during a vehicle impact, the knee bolster airbag system comprising:

a base configured to be mounted in the vehicle adjacent the instrument panel, the base having a first edge and an opposite end;

a cover having a first edge and an opposite end, the first edge of the cover pivotally connected to the first edge of the base;

an airbag having a stored state and an inflated state, the airbag disposed between the cover and the base; and a tether connecting the opposite end of the base to the opposite end of the cover so that when the airbag inflates, the cover pivots relative to the base about the first edge of the base, and an opening is created between the opposite end of the base and the opposite end of the cover so that the inflated airbag can extend therethrough while the tether maintains the cover relative to the base wherein the occupant contacts the airbag cushion during impact.

17. The knee bolster of claim 16 wherein the first edge of the base is the top of the base, the first edge of the cover is the top of the cover, the opposite end of the base is the bottom of the base, and the opposite end of the cover is the bottom of the cover.

18. The knee bolster of claim 16 wherein the opposite end of the base is the top of die base, the opposite end of the cover is the top of the cover, the first edge of the base is the bottom of the base, and the first edge of the cover is the bottom of the cover.

19. The knee bolster of claim 16 further comprising a gas source.

* * * * *

UNITED STATES PATENT AND TRADEMARK OFFICE
CERTIFICATE OF CORRECTION

PATENT NO. : 6,464,255 B1  
DATED : October 15, 2002  
INVENTOR(S) : Darius J. Preisler et al.

It is certified that error appears in the above-identified patent and that said Letters Patent is hereby corrected as shown below:

Column 4,  
Line 47, delete "stare" and insert therefor -- state --.

Signed and Sealed this

Eleventh Day of February, 2003

JAMES E. ROGAN  
*Director of the United States Patent and Trademark Office*